INVENTOR.
BY HENRY A. COCCO
Walter B. Udell
ATTORNEY

United States Patent Office 3,425,305
Patented Feb. 4, 1969

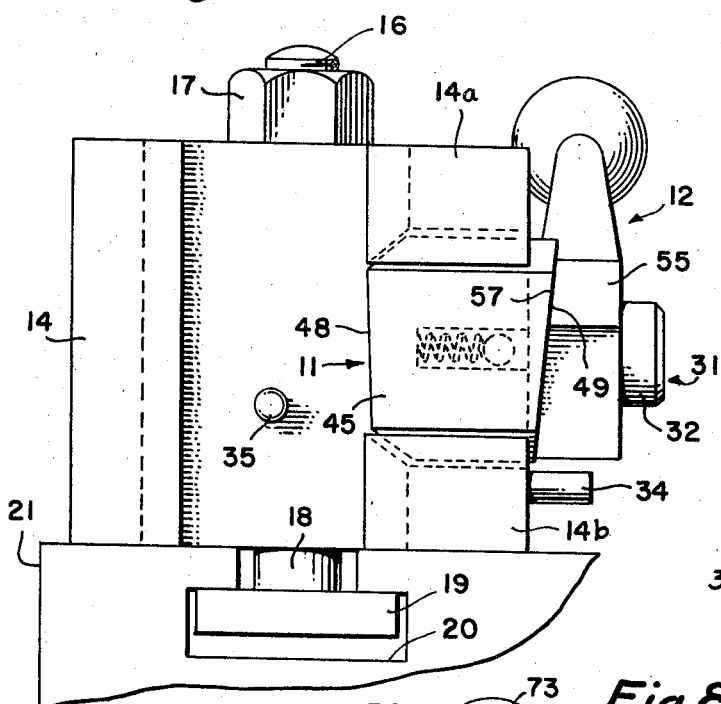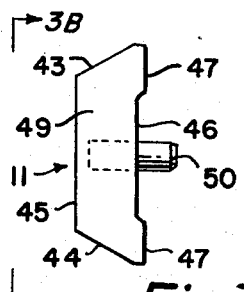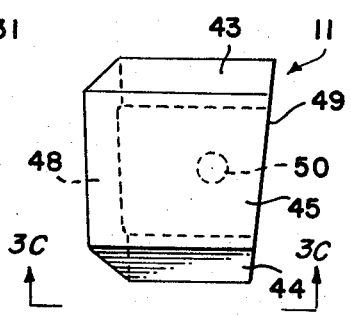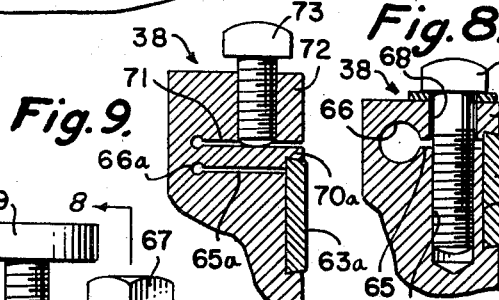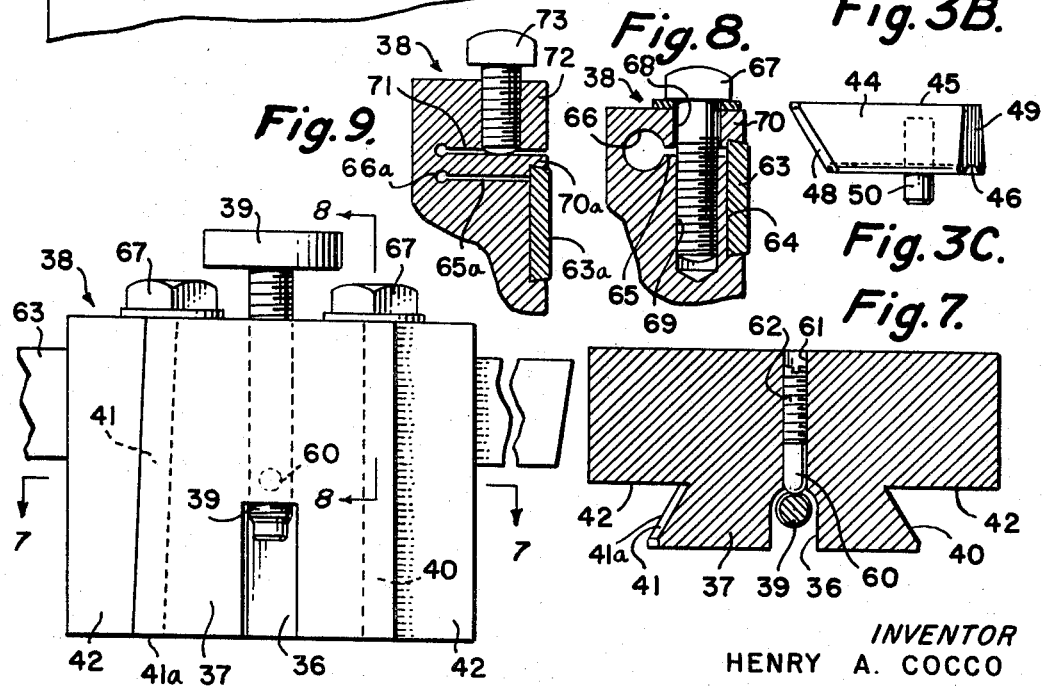

3,425,305
TOOL POST AND TOOL HOLDER
Henry A. Cocco, Broomall, Pa. 19008
Filed Sept. 2, 1966, Ser. No. 581,418
U.S. Cl. 82—36       10 Claims
Int. Cl. B23b 29/00

ABSTRACT OF THE DISCLOSURE

A tool post and tool holder insertable thereinto; the tool holder having a dovetail wedge mounting projection extending laterally from its rear face longitudinally in the direction of insertion into the tool post, one side surface of the dovetail being inclined at an angle so that the width of the dovetail decreases from a maximum at the tool post insertion end to a minimum at the opposite working end of the wedge; the tool post including a block having a dovetail recess extending through the front face from the top to the bottom and locking slide channel which opens into the recess through a wall of the block which defines one side surface of the recess, a locking slide slidably disposed in the slide channel, and an operating handle engaged with the locking slide to respectively drive the locking slide into the recess to overlyingly engage the angularly inclined wedge side surface and thereby lock a tool holder therein, and permit retraction of the locking slide from the recess to release the tool holder and permit withdrawal from the tool post block. Also provided is a tool holder carried adjusting screw rotatable to cause the tool holder to be shifted to a desired position in the tool post together with an adjustable friction lock engaged with the threads of the adjusting screw to prevent undesired rotation and insure precisely repeatable positioning of the tool holder within the tool post.

---

This invention relates generally to tool posts, and more particularly relates to an improved tool post and tool holder for holding the different shaping, boring and cutting tools normally employed with lathe type machines.

Tool posts per se are of course very old and have taken many different forms, some of which are simple in construction and others of which are quite complicated. Regardless of the particular form taken by the known types of tool posts, all such devices have as a common object the provision of a rigid and immovable support for the working tools which it is desired to bring into engagement with the lathe held work.

It often occurs in the production of machined articles that during the course of manufacture it is necessary to carry out several different machining operations requiring the use of different cutting and shaping tools. Such operations can be carried out with rapidity when performed on a turret lathe because the necessary change of tooling is very quickly and easily accomplished. However, turret lathes are substantially more expensive than the usual lathe which includes provision for mounting only one machining tool at a time. In this latter case it is necessary for a change of machining that one tool be demounted from the tool post and be replaced by another. With simple tool posts this is a time consuming job because the newly installed tool must be properly indexed to the work before machining can be continued. This of course results in considerable non-productive downtime in any machining process where the tooling must be changed several times during the course of manufacture of an article.

In order to avoid this substantial downtime so that the costs of production may be decreased, many tool posts have been constructed with a view toward making the substitution of one tool for another a relatively simple and quickly accomplished procedure. Tool posts have in fact been constructed which achieve this purpose. However, such tool posts generally themselves require complicated machining and include a considerable number of working parts all of which results in a tool post which while operative for its intended purpose is nevertheless itself an item of considerable expense. The simpler types of tool posts usually suffer from constructional features which eventually cause wear in the parts of the tool post which interfere with the required precision operation desired.

Additionally, it frequently occurs that it is desirable to carry out reverse cutting operations, that is, cutting operations wherein the tool position is reversed in the tool holder so that the cutting edge is down and the lathe is reversely rotated in the upward direction relative to the operator. One instance of such use is encountered when cutting brittle materials such as bronze or cast iron which throw chips rather than taking curls. With conventional operation, the downward rotation of the lathe causes the chips taken to be thrown upward toward the face of the lathe operator, and while a protective face mask can be used the operator's vision is not as good as is desirable. This problem is readily resolved by reversing the cutting tool and by reversing the direction of lathe rotation from down to up so that the chips are thrown downward onto the bed of the lathe.

The upward rotation of the lathe produces an upward thrust on the tool and tool holder tending to drive the latter upward out of the tool post. Any upward movement of the tool holder tending to eject the latter is of course highly dangerous to the lathe operator, and even a small shift will result in a mispositioning of the cutting tool which can completely ruin the workpiece, as for example by changing the pitch of a thread being cut on a cylindrical object. Such thread cutting with reverse lathe rotation would be carried out for example on an object having a deep shoulder where the threads must be cut from one end up to the shoulder.

With conventional lathe rotation a right hand thread, for example, must be cut from right to left toward the shoulder. This often results in tool breakage and spoilage of the workpiece because the tool can not be retracted from the lead screw advance axis fast enough to clear the shoulder. This problem is also avoidable by cutting the thread from left to right beginning at the shoulder and progressing toward the free end and reversing the tool position and lathe rotation to maintain the same handedness of the thread being cut.

From the foregoing examples it will be appreciated that reverse cutting operations are frequently desirable and sometimes indispensable, and that in carrying out such operations it is mandatory for accuracy and safety that the cutting tool be prevented from shifting when subjected to the sometimes considerable upward thrust exerted thereon by certain machining operations. This function is effected in the instant invention by mechanical co-operation between parts of the novel tool post and novel tool holder.

Finally, as will be subsequently seen, the tool holders are provided with an adjusting screw for varying and fixing the height of the tool holder and hence the cutting tip of the tool. Once adjusted it is desired that this height remain invariant for the entire production run. Unfortunately, undesired rotation of this height adjusting screw can occur due to the vibration of retouching the front face of the tool, as by grinding, or by accidental bumping or jarring of the tool holder when the latter is repetitively removed from and inserted into the tool post during a production run. Such screw rotation causes loss of tool center height thereby changing pre-set tolerances. This problem is overcome in the novel tool holder according to the invention by a simple but effective frictional lock for the height adjusting screw.

Accordingly, it is a primary object of my invention to provide a novel tool post adapted to be utilized with a plurality of individual substantially identical mechanically cooperating novel tool holders which enable tooling changes to be made extremely rapidly with high precision of tool positioning, and with tool holder anti-shift and anti-ejection means which prevent inadvertent tool position changing and dangerous ejection of the tool holder from the tool.

Another object of my invention is to provide a novel tool post and tool holder as aforesaid of extremely simple construction in which the various parts are inexpensive and simple to manufacture.

A further object of my invention is to provide a novel tool post usable with a novel tool holder structure which may be repetitively clamped into and removed from the tool post, including adjustable position holding means, such that the tool holder is always positionable at precisely the same setting in the tool post.

A still further object of my invention is to provide a novel tool post in which a plurality of tool holders each carrying its own tool may be properly positioned in and locked to the tool post or released and removed from the tool post in a matter of seconds. The foregoing and other objects of my invention will become clear from a reading of the following specification in conjunction with an examination of the appended drawings, wherein:

FIGURE 1 is an exploded perspective view of the novel tool post according to the invention showing the several parts separated from one another and in some cases rotated to reveal structural features which would otherwise be concealed, a typical novel tool holder used with the novel tool post being also illustrated in a position of ninety degree rotation to that which it normally assumes when disposed in the tool post;

FIGURE 2 is an enlarged front elevation of the novel tool post according to the invention;

FIGURES 3A, 3B and 3C are respectively end, front and bottom plan views of the locking slider element of the tool post as would be seen when viewed along the lines 3A—3A, 3B—3B and 3C—3C of FIGURES 1, 3A and 3B respectively;

FIGURE 6 is a rear elevational view of the novel tool holder seen in perspective in FIGURE 1;

FIGURE 7 is a horizontal sectional view through the novel tool holder of FIGURE 6 as would be seen when viewed along line 7—7 thereof;

FIGURE 8 is a vertical sectional view taken on line 8—8 of FIGURE 6; and

FIGURE 9 is a view similar to that of FIGURE 8 but showing a modified form of tool clamp.

In the several figures, like elements are denoted by like reference characters.

Briefly, the invention contemplates a tool post assembly of very simple construction requiring very little machining and using few parts which principally consist of a tool post block for accepting tool holders, a locking slide shiftable within a channel in the tool block, and a locking slide actuating operating handle effective to shift the slide toward a tool holder held by the tool post block to rigidly lock the holder to the block. The shifting movement of the locking slide is achieved by the provision of a camming surface on a slide face which presents toward and is in engagement with a complementally contoured cam surface on the operating handle so that rotation of the operating handle in one sense shifts the camming surfaces relatively to one another and drives the locking slide into locking engagement with the tool holder by overcoming the counter force of a biasing spring. Counter rotation of the operating handle permits the biasing spring to retract the locking slide from engagement with the tool holder and release the latter so that it may be quickly removed from the tool post block.

The face of the locking slide which engages the tool holder and the face of the tool holder so engaged are complementally provided with a draft so that the locking slide face overlies the engaged tool holder face to thereby prevent upward movement of the tool holder when the locking slide is engaged thereagainst and to positively cam the tool holder down against the tool-post-carried stop pin to yield precisely repeatable tool settings. The height adjusting screw of the tool holder is provided with an adjustable screw operated frictional holding device. Additionally, two forms of novel cut-off tool holder are shown.

Figure 1:
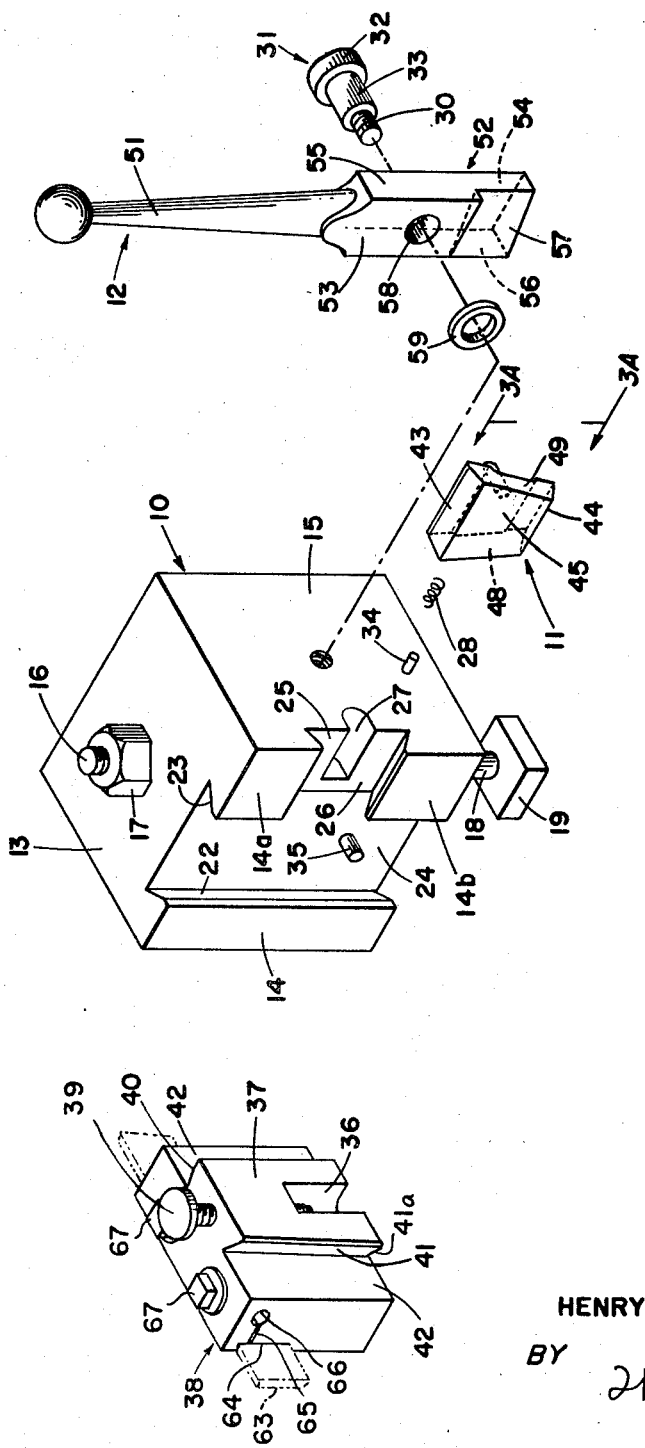

Referring now to the drawings, and firstly to FIGURES 1 through 3, the principal operating parts of the novel tool post according to the invention are seen to include the tool post block 10, locking slide 11 and operating handle 12. The tool post block 10 is a generally cubical metal block having a top surface 13, front face 14 and end face 15. The block 10 is vertically drilled completely therethrough from top to bottom so that a close fitting bolt 16 may be projected therethrough and secured on the top face by means of a nut 17. A portion of the bolt shank lower end 18 project out of the tool post block 10 below the undersurface thereof and terminates in a threaded end which is threadedly engageable into a T-slot nut 19 adapted to be disposed within the T-slot 20 of a lathe compound rest 21, as best seen in the showing of FIGURE 2. The tool post block 10 is, in the usual manner, rigidly affixed to the compound rest by wrenching the nut 17 so that the bolt 18 is tightly drawn up to lock the block in a desired position.

The block 10 is machined vertically from top to bottom and through the front face 14 to provide a dovetail recess of generally equilateral trapezoidal shape in horizontal cross-section defined by side bounding surfaces 22 and 23 and a rear surface 24, which latter represents the longer base of the trapezoid and is parallel to the front face 14 of the block 10. Machined horizontally through the block 10 from the end face 15 completely through the dovetail recess side bounding surface 23 is the slide channel 25 also of generally equilateral trapezoidal shape in vertical cross-section with the smaller trapezoidal base parallel to and defining an opening through the front face of the block 10 to divide the latter into an upper front face region 14a and a lower front face region 14b. The slide channel rear wall 26 defined by the the larger trapezoidal base is parallel to the tool post block front face areas and also to the dovetail recess rear wall 24 while being forwardly offset somewhat from the latter.

Figure 5:
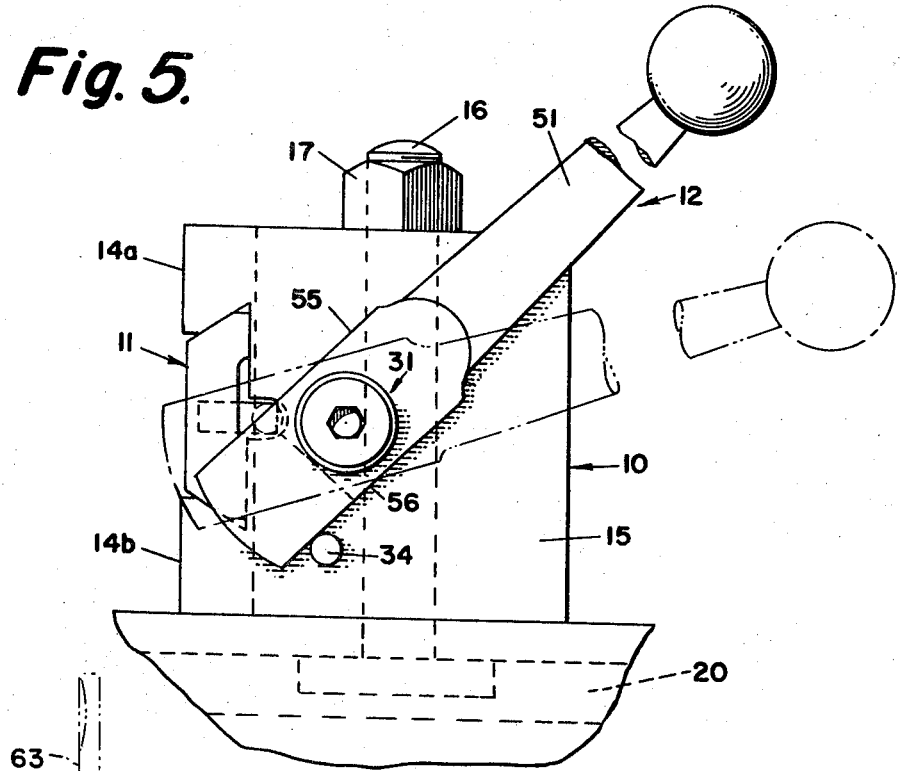
FIGURE 5 is an end elevation of the tool post according to the invention as would be seen when viewed along the line 5—5 of FIGURE 2.

Machined inward from the end face 15 toward the dovetail recess side surface 23 and rearward from and cutting through the slide channel rear wall 26 is a slot 27 within which is disposed a compression coil spring 28 to provide the retracting bias for the locking slide 11 as will be seen more fully hereinafter. Drilled and tapped into the block 10 from the end face 15 is a threaded hole 29 for receiving the threaded end 30 of the operating handle securing shoulder stud 31. Between the threaded end 30 and the head 32 of shoulder stud 31 is the smooth cylindrical shank 33 which acts as a pivot for the operating handle 12. Set into the end face 15 of the tool post block 10 is a handle limit pin 34 which, as best seen in the showing of FIGURE 5, limits downward rotation of the working end of the operating handle 12 so that it never disengages from the working cam surface of the locking slide 11 to thereby avoid ejection of the locking slide from the tool post block under urging from the compression coil spring 28.

Set into the tool post block 10 and extending forward from the dovetail recess rear wall 24 is a stud 35 projectable into the stud slot 36 of the dovetail wedge 37 of tool holder 38. The stud 35 provides a stop for the lower end of the vertically adjustable tool holder height adjusting screw 39 threaded vertically downward through the tool holder dovetail wedge 37 and into the stud slot 36. By means of the adjusting screw 39 it will be understood that the vertical position of the tool holder 38 is selectively adjustable. As best seen in FIGURES 6 and 7, the adjusted position of the tool holder is precisely maintained by insuring against inadvertent undesired rotation of adjusting screw 39 through the medium of a deformable plastic plug 60 disposed in the threaded bore 61 which extends rearward from the front face of the tool holder to the stud slot 36. The plug 60 is adjustably pressed against the threads of adjusting screw 39 by means of the set screw 62 threaded into bore 61 behind the plug so that the set screw is adjustable from the front face of the tool holder when the latter is operatively installed in the tool post. The frictional surface engagement of the plug 60 with the adjusting screw threads is set to the requisite level by rotation of set screw 62.

As is best seen in the showings of FIGURES 1, 2, 4 and 6, the tool holder 38 is positioned in the tool post block 10 by vertically lowering the dovetail wedge 37 of the tool holder downward into the dovetail recess of the tool post block so that the angled faces 40 and 41 of the dovetail wedge 37 are apposed respectively to the dovetail recess side bounding surfaces 22 and 23 with tool holder face 40 and recess surface 22 substantially surface engaged and with the rear face 42 of the tool holder 38 being flatwise disposed against the coplanar front faces 14, 14a and 14b of the tool post block 10. The surface clearances between the tool holder and tool post block are on the order of four thousandths of an inch so that an easy sliding fit obtains.

The width of the tool holder dovetail wedge 37 from the bottom edge 41a of tool holder face 41 to the bottom edge of face 40 is just slightly less than the width of the dovetail recess in the tool post, the face 41 converging toward face 40 from bottom to top of the tool holder so that when the tool holder is installed in the tool post the tool holder face 41 diverges laterally from tool post recess surfaces 23 from bottom to top. The draft angle of face 41 may be on the order of one half degree but is exaggerated for clarity in the showing of FIGURE 6.

The locking slide 11 is of substantially equilateral trapezoidal form in vertical cross section for a close sliding fit within the slide channel 25 of the tool post block 10, having upper and lower angle faces 43 and 44 respectively, a front face 45 corresponding to the smaller trapezoidal face, and a rear face parallel to the front face, the rear face being longitudinally recessed forward as at 46 to divide the same into upper and lower longitudinally extending coplanar slide surfaces 47 flatwise engageable with the slide channel rear wall 26. The slider depth between front and rear faces 45 and 47 is slightly less than than the depth of slide channel 25 so that the slider front face 45 is disposed rearward of the tool post block upper and lower front faces 14a and 14b to prevent binding engagement with the tool holder rear face 42.

The left hand end face 48 is cut back at the same angle as is the dovetail recess side surface 23 of the tool post block 10 and the angled face 41 of the tool holder dovetail wedge 37, and is also provided with a draft angle complemental to that of the tool holder dovetail wedge face 41, as best seen in FIGURES 2, 3B, 3C and 4 so that the end face 48 may be moved into coplanar relationship with the tool holder wedge face 41 through tool post dovetail recess side surface 23 by longitudinal movement of the locking slide 11. This end face 48 is thus seen to be the clamping end face of the locking slide which is shiftable against the face 41 of the tool holder dovetail wedge 37 when the tool holder is disposed within the tool post block. The right hand end face of locking slide 11 designated as 49 is the camming end face engageable by the camming surface of the operating handle 12 and which lies in a plane perpendicular to the front and rear faces 45 and 47 of the slide 11 disposed typically at an angle of approximately five degrees from the vertical.

Figure 4:
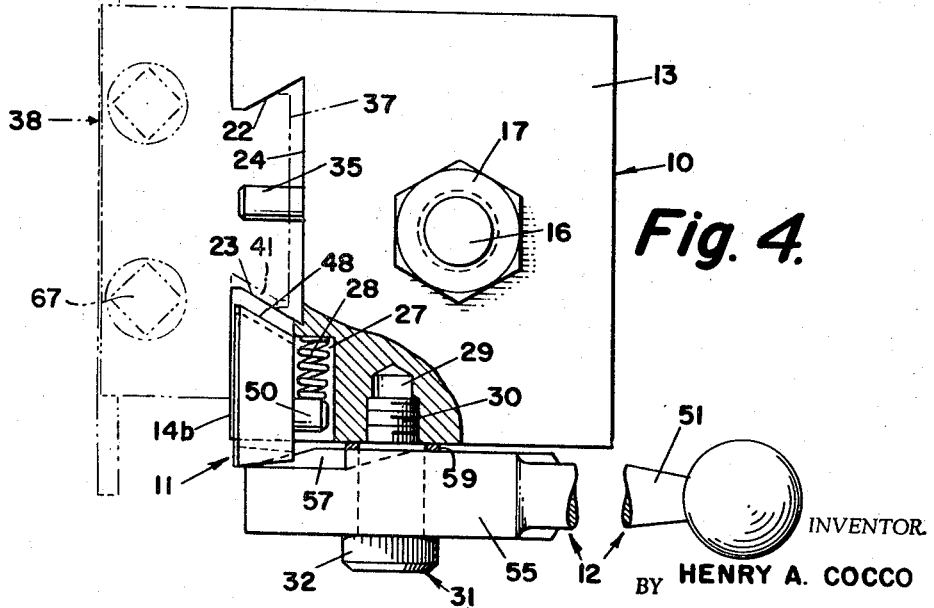
FIGURE 4 is a plan view of the novel tool post according to the invention as would be seen when viewed along the line 4—4 of FIGURE 2.

Rigidly affixed to and projecting rearward from the locking slide 11 is a slide bias pin 50 which projects into the slot 27 in the tool post block 10 with the side of the bias pin 50 disposed against the outer end of compression coil spring 28 in the manner most clearly seen in the showing of FIGURE 4. The pin 50 is so positioned relative to the length of the locking slide 11 and coil spring 28 that the spring 28 is always capable of retracting the locking slide 11 sufficiently to disengage the clamping end face 48 of the slide from any tool holder which might be disposed in the tool post block, while also avoiding bottoming of the turns of the spring 28 when the slide 11 is in its tool holder locking position.

The operating handle 12 includes an elongated lever section 51 joined at one end to the working end 52 which latter is formed in the general shape of a rectangular parallelepiped having parallel planar inner and outer side faces 53 and 54 respectively and upper and lower faces 55 and 56 respectively. The end region of the working end 52 is machined on the inner side face 53 between the upper and lower faces 55 and 56 to provide a planar camming surface 57 which intercepts the plane of the inner face 53 at the lower face 56 and is divergent from the inner face 53 at the upper face 55 so that in effect the upper face 55 is resected back for a distance from the inner face 53 toward the outer side face 54. The angle of the plane of the camming surface 57 with respect to the plane of the inner side face 53 is the same as that of the camming end face 49 of locking slide 11, and in the illustrated case is approximately five degrees.

Extending through the working end 52 orthogonally to and through the inner and outer side faces 53 and 54 is a pivot bore 58 of proper diameter to permit free relatively close fitting smooth passage therethrough of the shank 33 of the shoulder stud 31. The shank 33 of shoulder stud 31 projects sufficiently through and beyond pivot bore 58 of operating handle 12 so that the shim washer 59 may also be disposed thereon to space the inner side face 53 of the operating handle outward of contact with the end face 15 of the tool post block.

With the shoulder stud projected through the operating handle and with the washer 59 disposed thereupon, assembly of the tool post is simply effected by placing the compression coil spring 28 in the slot 27 of the block 10, projecting the locking slide 11 into slide channel 25 with the slide bias pin 50 engaged against the end of compression spring 28, engaging the camming surface 57 of the operating handle against the locking slide cam surface 49 with the lower face 56 of the operating handle above the handle limit pin 34, and then projecting the threaded end 30 of shoulder stud 31 into the tapped hole 29 in the tool post block 10 and tightening the shoulder stud.

With the unit assembled as shown in FIGURES 2, 4 and 5, it is observed from FIGURE 5 that limit pin 34 prevents rotation of the handle 12 beyond the solid line positional showing so that it is clear that locking slide 11 is held captive in the tool post block 10 and cannot be ejected by action of the compression coil spring 28 because the camming locking slide end face 49 is engaged by the camming surface 57 of the operating handle 12. As will be best seen from FIGURES 2 and 4, downward rotation of the handle lever 51 causes the handle-carried camming surface 57 to rotate upward in sliding engagement against the locking slide camming surface 49 and causes the locking slide 11 to shift horizontally inward toward the dovetail recess. Typically, in the illustrated configuration a lateral shift of substantially fifty thousandths of an inch for the locking slide 11 is effected with camming surfaces at a five degree cam angle for a thirty degree rotation of the operating handle 12. Since, as previously described, clearances between the tool holder dovetail and the tool post dovetail recess would be typically on the order of four thousandths of an inch, smaller camming angles or operating handle angle of throw could be utilized if desired. However, the above mentioned typical values are practical for a mass production item.

Since the camming surface 57 of the operating handle is rotating rather than sliding rectilinearly upward, theoretically surface engagement between the camming surfaces 57 and 49 can only occur at one precise position. Consequently, the dimensional relationships are so chosen between the parts that locking engagement between the locking slide 11 and a tool holder disposed within the dovetail recess occurs with the operating handle in that position corresponding to surface engagement between the camming surfaces. In the illustrated case this would be when the locking handle 12 was in a horizontal position.

This theoretical consideration, as a practical matter, is not overly important since the angular range of operating handle throw, about the lock-up position, is relatively small, and, if desired, surface engagement of the camming surfaces throughout this small rotational range of the handle 12 is readily achieved by allowing for just the slightest amount of wobble of the handle 12 on the shoulder stud 31. In practice, it has not been found necessary to make any specific provision for this. The various parts of the apparatus, compression spring 28 excepted, would of course be made of hardenable steel to provide good wearing properties. It should be particularly noted that the operating handle 12 rotates about the smooth surface shank 33 of the shoulder stud 31 and that the shoulder stud does not itself rotate during operation of the device. Consequently no wear whatever takes place between the threads 30 of the shoulder stud 31 and the threads of tapped hole 29 in the tool post block.

From the foregoing it will be now appreciated that interchange of a number of tool holders carrying differing types of tools for effecting a sequence of different machining operations can be quickly and easily carried out with substantially no downtime whatever, release and removal of one tool holder followed by insertion and positive anti-ejection lock-up of a succeeding tool holder being readily accomplished in a matter of seconds.

Turning now again to the tool holder illustrated in FIGURES 1, 6 and 8, and particularly referring to FIGURE 8, it is observed that the particular tool holder shown is one for holding a cut-off tool, designated as 63, and which is formed generally from flat bar stock having oppositely angulated upper and lower faces to thereby exhibit a trapezoidal cross-section. The front face of tool holder 38 proximate to the upper end is recessed horizontally from one side to the other to form a slot 64 for complementally slidably captively receiving the cut-off tool 63. The upper wall defining the upper edge of the slot 64 is hingingly vertically shiftable by virtue of the end to end longitudinally extending horizontal slot 65 which extends rearward through the tool holder and terminates in the stress relief bore 66, and the clamping bolts 67 extending freely downward through bores 68 into threaded engagement within the tapped holes 69. Tightening of the bolts 67 depresses the tool holder top section 70 to thereby vertically narrow the slot 64 and clamp the cut-off tool 63 along its entire length instead of merely at discrete points as is the case with usual tool holders.

FIGURE 9 illustrates a modification of the cut-off tool holder of FIGURE 8 which also accomplishes tool clamping along its full length. In FIGURE 9 the elements designated as 63a, 65a, 66a and 70a correspond in organization and function to the elements designated 63, 65, 66 and 70 in FIGURE 8, the difference residing in the mode of effecting movement of the depressible sections 70 and 70a. In FIGURE 9 the section 70a defined by slots 65a and 71 is not the tool holder top section but is rather a depressible intermediate section, the top section 72 being a rigid part of the tool holder structure through which clamping bolts 73 are vertically threaded. Tightening of the clamping bolts causes the lower end thereof which bear on the depressible section 70a to depress the latter and thereby clamp cut-off tool 63a.

Having now described my invention in connection with particularly illustrated embodiments thereof, it will be appreciated that variations and modifications of my invention may now occur from time to time to those persons normally skilled in the art without departing from the essential scope or spirit thereof, and accordingly it is intended to claim the same broadly as well as specifically as indicated by the appended claims.

What is claimed as new and useful is:

1. A tool post and tool holder for insertion thereinto and locking thereto, comprising
    (a) a tool holder having a mounting projection thereon extending laterally of a face of the tool holder, and said mounting projection extending longitudinally in the direction of insertion into the tool post and decreasing in at least one transverse dimension from a maximum at the tool post insertion end to a minimum at the opposite working end of said mounting projection,
    (b) a tool post comprising in combination,
        (1) a tool post block having a recess formed therein opening through at least one face of the block, which recess is sized and shaped to close fittingly slidably receive thereinto the tool holder mounting projection, said tool post block also having formed therein a locking slide channel one end of which opens into the recess through a wall of the block which defines one side surface of the recess,
        (2) a locking slide in said tool post block close fittingly slidably disposed within the said locking slide channel for movement therein, one end of said locking slide being proximate to and shiftable through the plane of the channel opening into the mounting projection receiving recess, said locking slide one end being shaped to engage with and overlie the side surface of the tool holder mounting projection disposable within said recess which is in apposition to the said locking slide channel open end,
        (3) and selectively operable means operatively coupled to said locking slide to respectively drive said locking slide into said mounting projection receiving recess to lock a tool holder therein and permit retraction of said locking slide from said recess to release the tool holder and permit withdrawal thereof from the tool post block.

2. The apparatus as described in claim 1 wherein the face of the tool holder from which extends the mounting projection is substantially slidably surface engageable with the said at least one face of the tool post block through which the tool post recess opens.

3. The apparatus as described in claim 1 wherein said tool holder mounting projection comprises a dovetail wedge at least one side surface of which is inclined at an angle so that the width of the dovetail decreases from a maximum at the tool post insertion end to a minimum at the opposite working end of the wedge, the angularly inclined wedge side surface being that engageable by the said one end of the tool post locking slide.

4. The apparatus as described in claim 1 wherein said tool holder mounting projection comprises a dovetail wedge at least one side surface of which is inclined at an angle so that the width of the dovetail decreases from a maximum at the tool post insertion end to a minimum at the opposite working end of the wedge, the angularly inclined wedge side surface being that engageable by the said one end of the tool post locking slide which latter is complementally angularly inclined to the angularly inclined dovetail wedge side surface that it engages.

5. The apparatus as described in claim 1 further including adjustable tool holder positioning means partly associated with said tool post and partly associated with said tool holder, one part of said positioning means being a fixed stop element and the other part of said positioning means comprising an adjusting screw rotatable to cause said tool holder to be shifted to a desired position in said tool post, and anti-rotation means engaged with said adjusting screw operative to restrain the latter from undesired rotation to thereby insure precisely repeatable positioning of said tool holder within said tool post.

6. The apparatus as described in claim 1 further including adjustable tool holder positioning means partly associated with said tool post and partly associated with said tool holder, one part of said positioning means being a fixed stop element and the other part of said positioning means comprising an adjusting screw rotatable to cause said tool holder to be shifted to a desired position in said tool post, and anti-rotation means engaged with said adjusting screw operative to restrain the latter from undesired rotation to thereby insure precisely repeatable positioning of said tool holder within said tool post, said anti-rotation means comprising a friction element surface engaged with a plurality of the threads of said adjusting screw and a selectively adjustable drive element operative to press said friction element against said adjusting screw threads to the extent required to prevent undesired rotation of said adjusting screw.

7. The apparatus as described in claim 1 further including adjustable tool holder positioning means partly associated with said tool post and partly associated with said tool holder, one part of said positioning means being a fixed stop element and the other part of said positioning means comprising an adjusting screw rotatable to cause said tool holder to be shifted to a desired position in said tool post, and anti-rotation means engaged with said adjusting screw operative to restrain the latter from undesired rotation to thereby insure precisely repeatable positioning of said tool holder within said tool post, and anti-rotation means comprising a friction element surface engaged with a plurality of the threads of said adjusting screw and a selectively adjustable drive element operative to press said friction element against said adjusting screw threads to the extent required to prevent undesired rotation of said adjusting screw, said fixed stop element being carried by said tool post while said adjusting screw and anti-rotation means engaged therewith are carried by said tool holder with said anti-rotation means selectively adjustable drive element being accessible for adjustment whether or not said tool holder is operatively engaged with said tool post.

8. The apparatus as described in claim 3 further including adustable tool holder positioning means partly associated with said tool post and partly associated with said tool holder, one part of said positioning means being a fixed stop element and the other part of said positioning means comprising an adjusting screw rotatable to cause said tool holder to be shifted to a desired position in said tool post, and anti-rotation means engaged with said adjusting screw operative to restrain the latter from undesired rotation to thereby insure precisely repeatable positioning of said tool holder within said tool post, said anti-rotation means comprising a friction element surface engaged with a plurality of the threads of said adjusting screw and a selectively adjustable drive element operative to press said friction element against said adjusting screw threads to the extent required to prevent undesired rotation of said adjusting screw, said fixed stop element being carried by said tool post while said adjusting screw and anti-rotation means engaged therewith are carried by said tool holder with said anti-rotation means selectively adjustable drive element being accessible for adjustment whether or not said tool holder is operatively engaged with said tool post.

9. For use in conjunction with a tool post having a receiving recess formed therein, a tool holder having a dovetail wedge mounting projection thereon extending laterally of a face of the tool, said dovetail wedge extending longitudinally in the direction of insertion into the tool post recess and having at least one side surface inclined at an angle so that the width of the dovetail decreases from a maximum at the tool post insertion end to a minimum at the opposite working end of the wedge.

10. The apparatus as described in claim 9 further including adjustable tool holder positioning means carried by said tool holder and engageable with fixed stop means carried by the tool post with which said tool holder is used, said positioning means comprising a rotatable adjusting screw adapted for end engagement with the post carried fixed stop to cause when rotated said tool holder to be shifted to a desired position in said tool post, and anti-rotation means engaged with said adjusting screw operative to restrain the latter from undesired rotation to thereby insure precisely repeatable positioning of said tool holder within the associated tool post, said anti-rotation means comprising a deformable friction element surface engaged with a plurality of the threads of said adjusting screw and a selectively adjustable drive element operative to press said friction element against said adjusting screw threads to the extent required to prevent undesired rotation of said adjusting screw.

References Cited

UNITED STATES PATENTS

| 2,390,148 | 12/1945 | Hijmans | 82—36 |
| 3,157,078 | 11/1964 | Powers | 82—36 |

FOREIGN PATENTS

| 883,151 | 3/1943 | France. |
| 975,130 | 11/1964 | Great Britain. |

LEONIDAS VLACHOS, *Primary Examiner.*

U.S. Cl. X.R.

82—37